(12) United States Patent
Jung et al.

(10) Patent No.: US 12,394,215 B2
(45) Date of Patent: Aug. 19, 2025

(54) METHOD OF RECOGNIZING CAR PARKING, SYSTEM FOR RECOGNIZING CAR PARKING, AND COMPUTER PROGRAM FOR THE METHOD

(71) Applicant: VESTELLALAB INC., Seoul (KR)

(72) Inventors: Sangsu Jung, Uiwang-si (KR); Dhananjay Singh, Yongin-si (KR); Yung Ji Choi, Seongnam-si (KR)

(73) Assignee: VESTELLALAB INC., Seoul (KR)

( * ) Notice: Subject to any disclaimer, the term of this patent is extended or adjusted under 35 U.S.C. 154(b) by 0 days.

(21) Appl. No.: 18/008,892

(22) PCT Filed: Aug. 18, 2022

(86) PCT No.: PCT/KR2022/012357
§ 371 (c)(1),
(2) Date: Dec. 7, 2022

(87) PCT Pub. No.: WO2023/075107
PCT Pub. Date: May 4, 2023

(65) Prior Publication Data
US 2024/0233381 A1 Jul. 11, 2024

(30) Foreign Application Priority Data

Nov. 1, 2021 (KR) .................. 10-2021-0148128

(51) Int. Cl.
*G06V 20/58* (2022.01)
*G06V 10/70* (2022.01)
(Continued)

(52) U.S. Cl.
CPC ............ *G06V 20/586* (2022.01); *G06V 10/70* (2022.01); *G06V 20/52* (2022.01); *G06V 20/60* (2022.01);
(Continued)

(58) Field of Classification Search
CPC .. G06V 10/70; G06V 2201/08; G06V 20/586; G06V 20/52; G06V 20/60; H04N 7/183
See application file for complete search history.

(56) References Cited

U.S. PATENT DOCUMENTS

2019/0329761 A1* 10/2019 Kim ...................... G06V 20/586
2019/0392229 A1* 12/2019 Yamamoto ........... G06V 20/586

OTHER PUBLICATIONS

Wang et al, "A Vision-Based Method for Parking Space Surveillance and Parking Lot Management" (published in Image and Graphics. ICIG 2015. Lecture Notes in Computer Science, vol. 9217. Springer, Cham. https://doi.org/10.1007/978-3-319-21978-3_45).*

* cited by examiner

*Primary Examiner* — Casey L Kretzer
(74) *Attorney, Agent, or Firm* — Maschoff Brennan

(57) ABSTRACT

The present invention provides a parking recognition method, which includes: acquiring a plurality of images photographed by one or more cameras, in relation to the at least one parking surface and the vehicle; determining a parking recognition time point as well as a corresponding camera for parking recognition ("a parking recognition camera") among the one or more cameras, based on a difference in images between the time-sequentially continued plural images; setting a parking surface occupying-judgment area for the at least one parking surface, based on images photographed by the parking recognition camera at the parking recognition time point; setting a vehicle recognition area for based on the images photographed by the parking recognition camera at the parking recognition time point; and determining whether the vehicle is parked on the at least one parking surface, based on the parking surface occupying-judgment area and the vehicle recognition area.

12 Claims, 7 Drawing Sheets

(51) Int. Cl.
*G06V 20/52* (2022.01)
*G06V 20/60* (2022.01)
*H04N 7/18* (2006.01)
(52) U.S. Cl.
CPC ......... *H04N 7/183* (2013.01); *G06V 2201/08* (2022.01)

[FIG. 1]
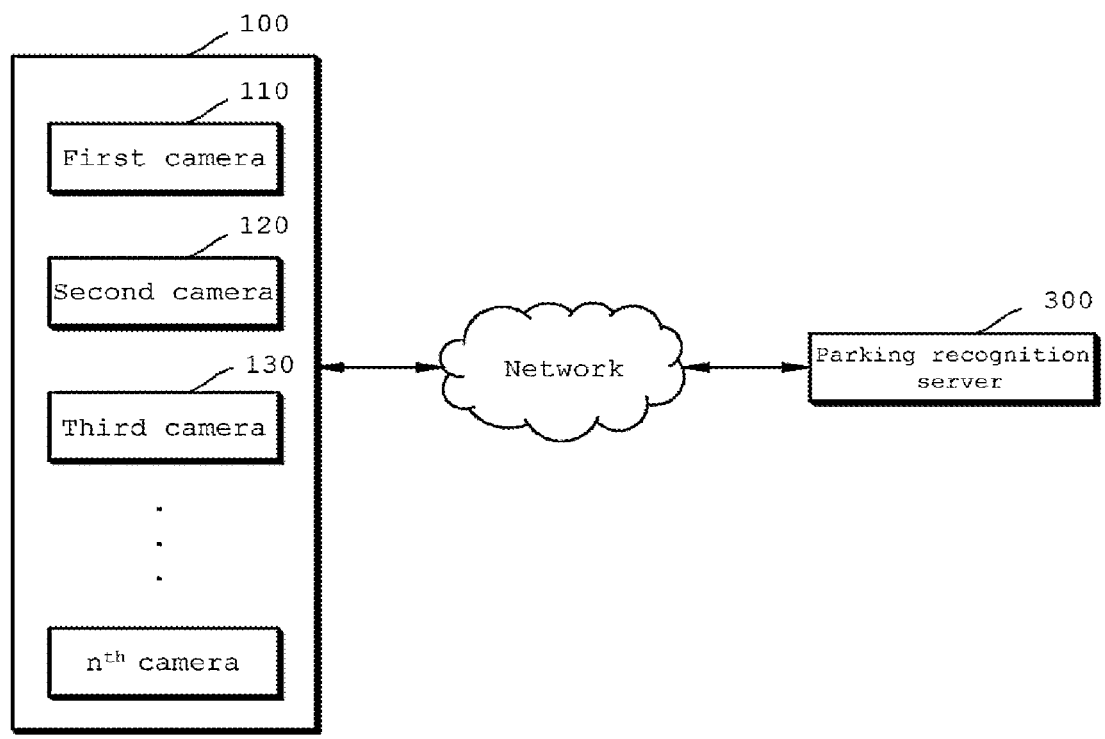

[FIG. 2]
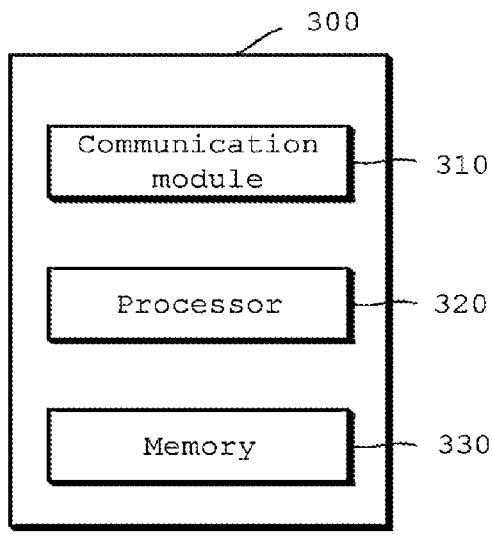
[FIG. 3]
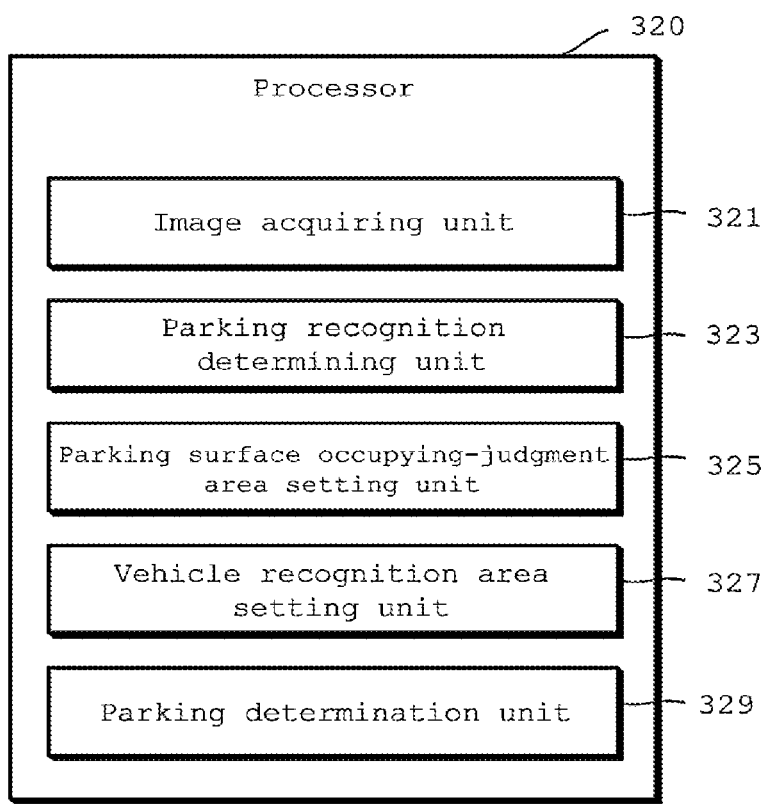

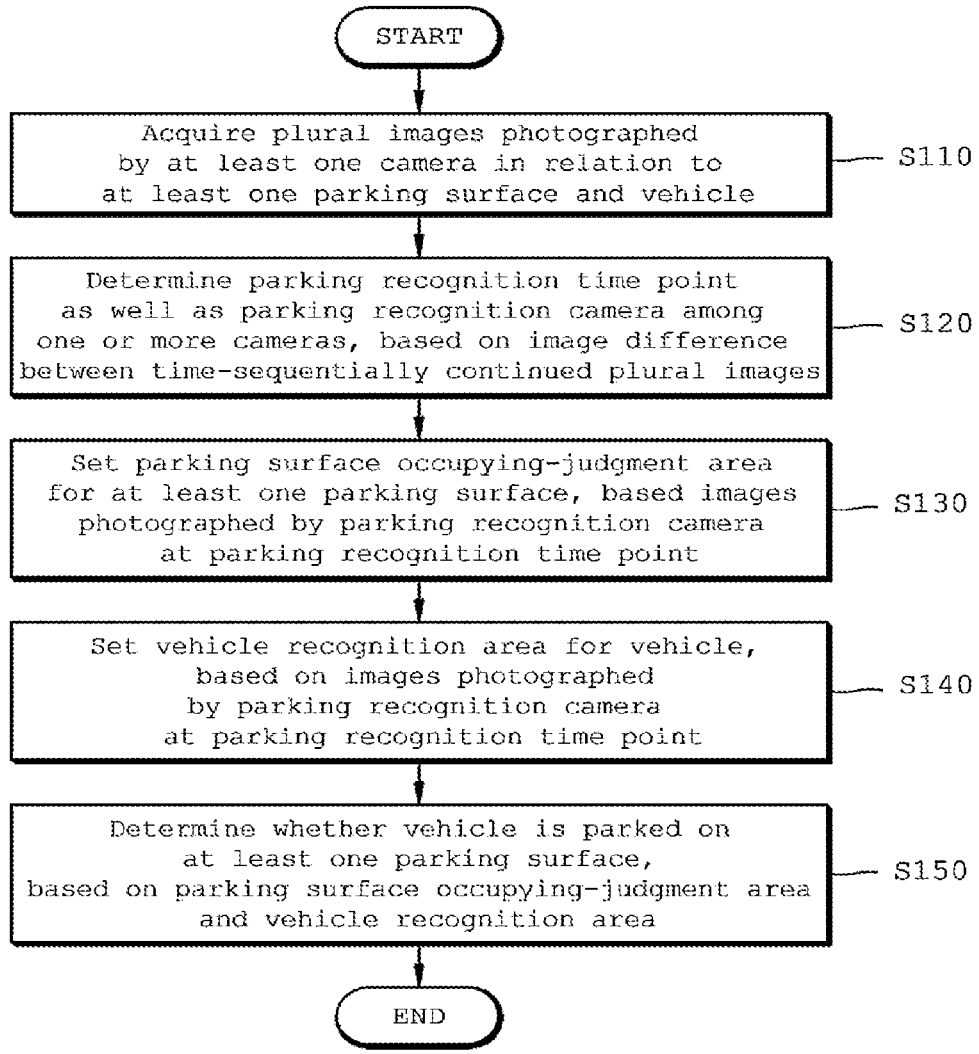
[FIG. 4]

[FIG. 5]
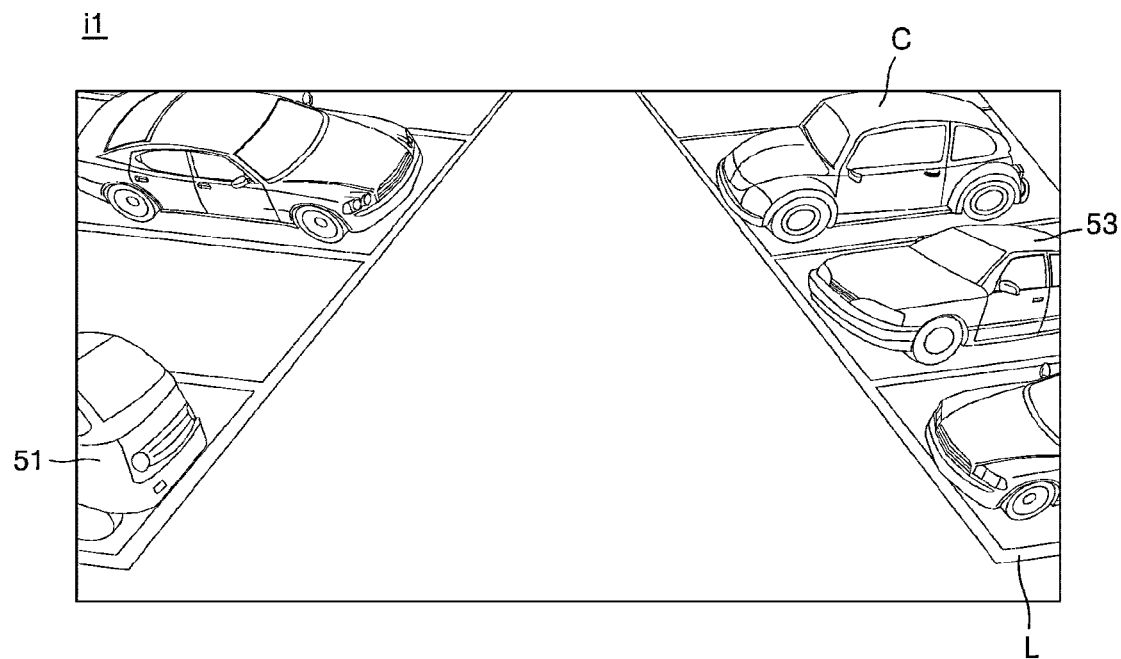
[FIG. 6]
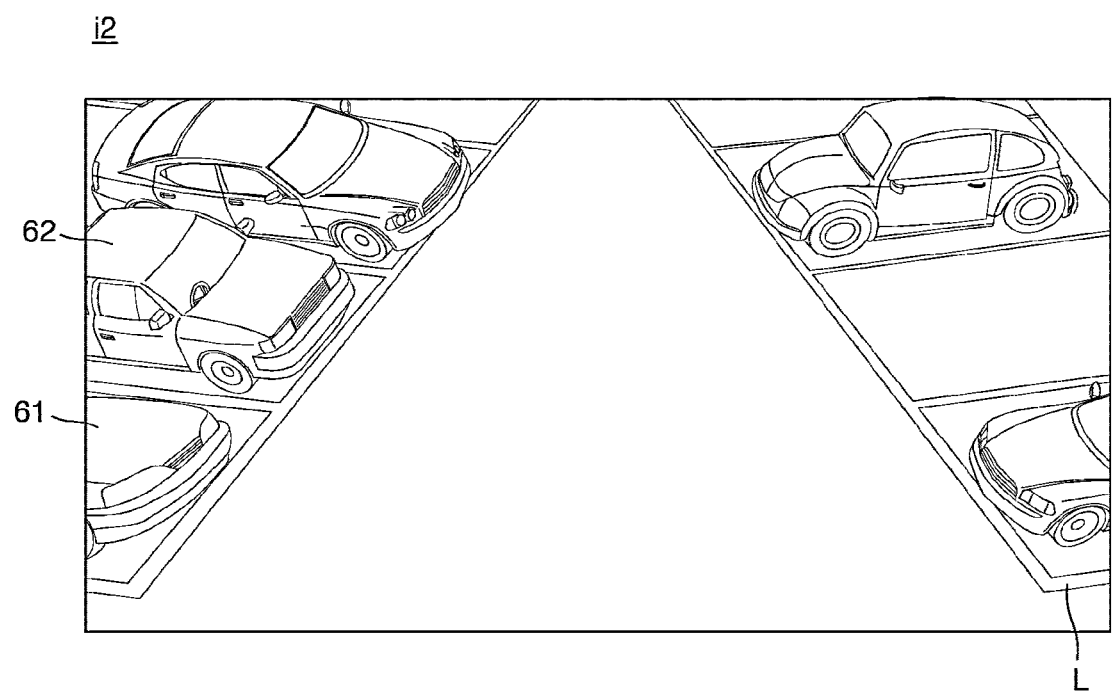

[FIG. 7]
[FIG. 8]
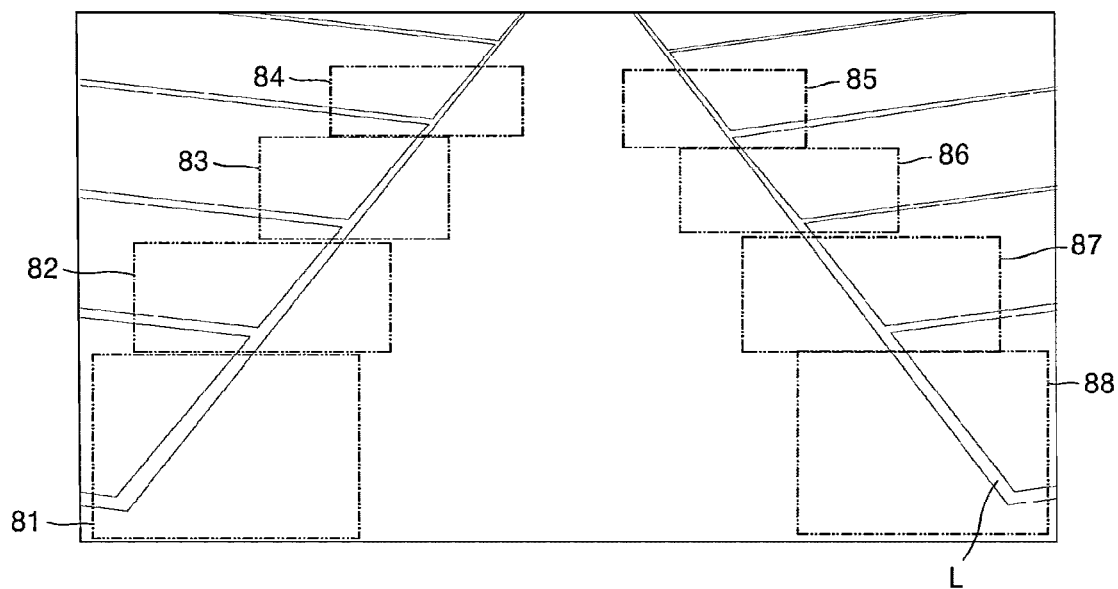

[FIG. 9]
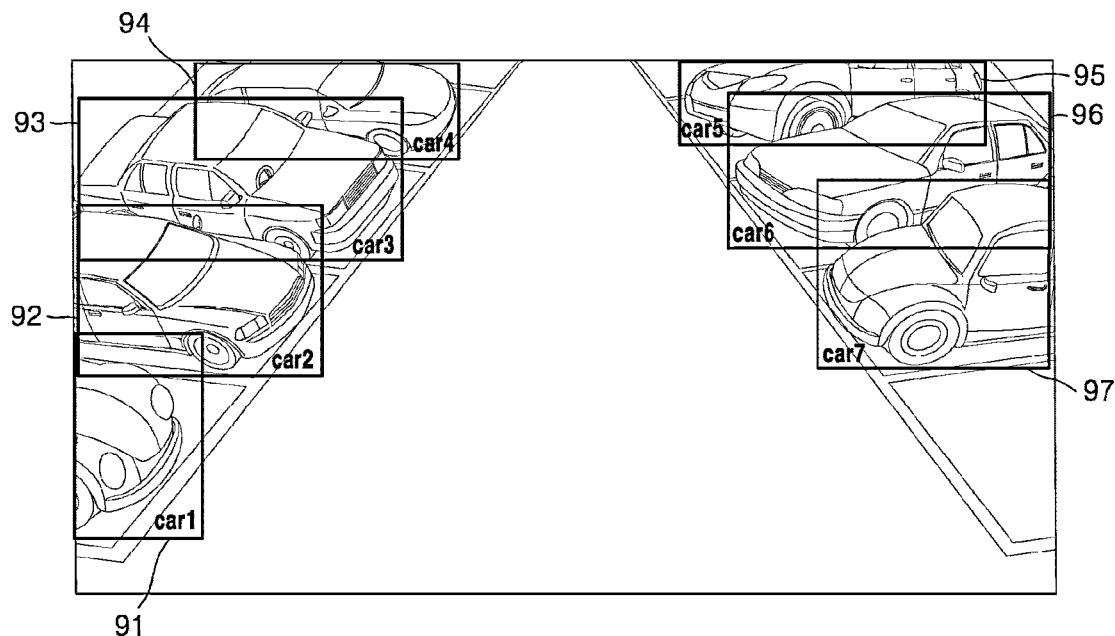
[FIG. 10]
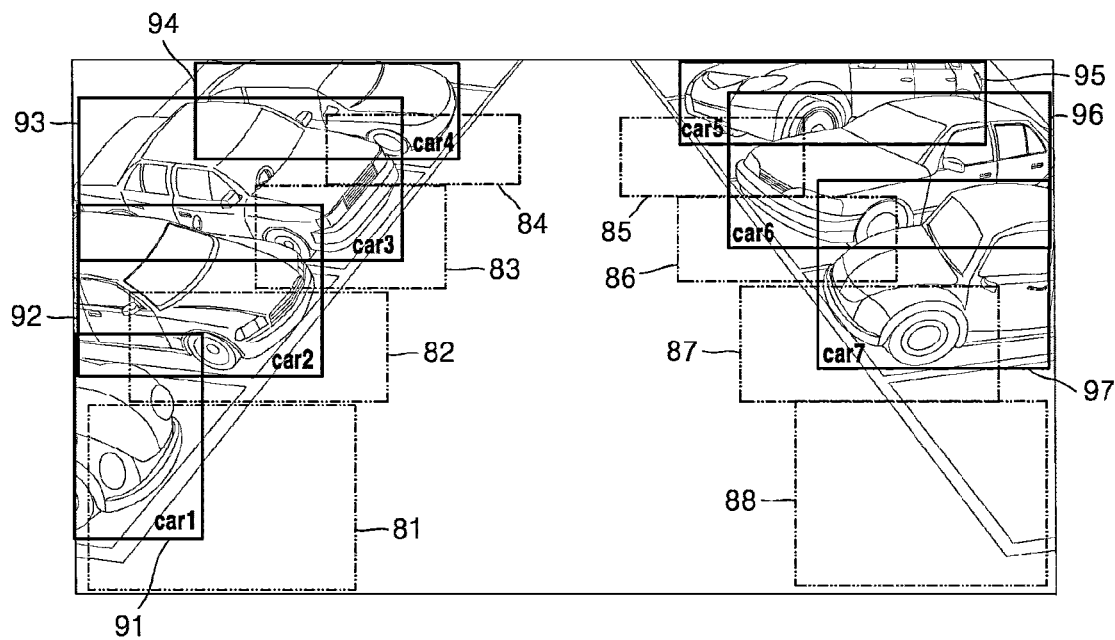

[FIG. 11]
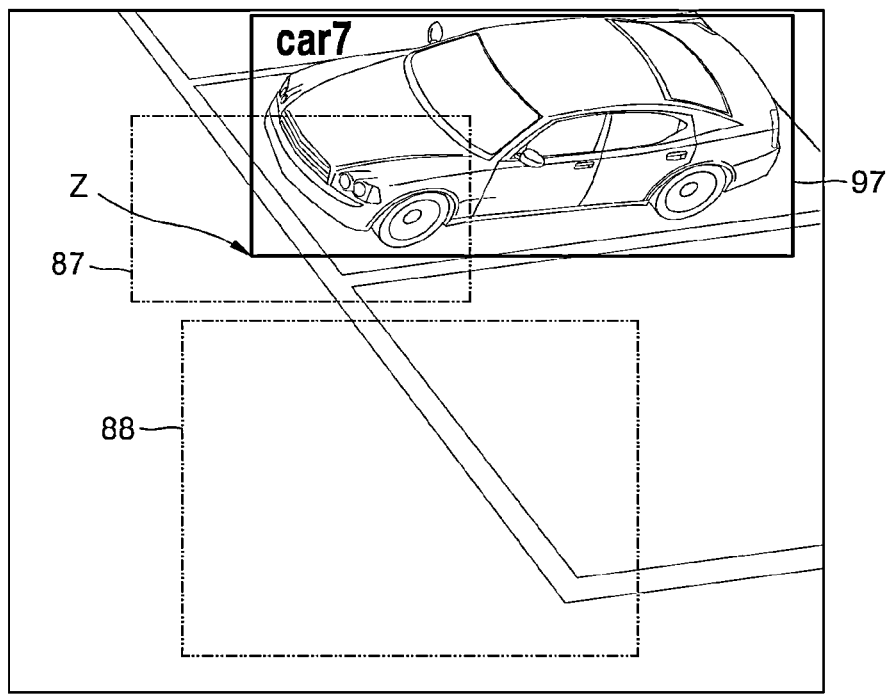

METHOD OF RECOGNIZING CAR PARKING, SYSTEM FOR RECOGNIZING CAR PARKING, AND COMPUTER PROGRAM FOR THE METHOD

FIELD OF INVENTION

Embodiments of the present invention relate to a parking recognition method, a parking recognition system, and a computer program stored in a recording medium for executing the above method, and more particularly, to a parking recognition method and a parking recognition system capable of efficiently recognizing a vehicle parked on a parking space, as well as a computer program stored in a recording medium in order to execute the above method.

BACKGROUND OF INVENTION

Generally, in a large parking lot such as a building, a hospital, an airport, a department store, a shopping mall, a government office, an apartment, an office, or the like, it is necessary to determine whether or not a vehicle is parked on a corresponding parking surface. This is very necessary to display whether the parking surfaces are full or not in the parking lot and the number of possible parking spaces to the driver, and to efficiently manage the parking lot. However, it is difficult to check around one by one in order to determine whether the vehicle is parked on each parking surface or the parking surface is vacant. Further, if a separate device is installed on a parking surface, a sensor should be mounted on each parking space, which in turn, increases installation costs and also causes an increase in failure probability due to a number of devices, hence entailing difficulties in efficient management and increasing maintenance cost. In addition, as for a driver, judgment on the parking space is restricted to the driver's view so that it is difficult to figure out (at a glance) the present parking condition of the entire parking space.

SUMMARY OF INVENTION

Technical Problem to be Solved

The present invention has been proposed to overcome different problems including the above problems, and an object of the present disclosure is to provide a parking recognition method and a parking recognition system capable of efficiently recognizing vehicles parked on corresponding parking surfaces, as well as a computer program stored in a recording medium in order to execute the above method. However, such an object is merely illustrative and the scope of the present invention is not particularly limited thereto.

Technical Solution

According to an aspect of the present invention, with regard to the parking recognition method for recognizing a vehicle parked on at least one parking surface, there is provided a parking recognition method, which includes: acquiring a plurality of images photographed by one or more cameras, in relation to the at least one parking surface and the vehicle; determining a parking recognition time point as well as a corresponding camera for parking recognition ("a parking recognition camera") among the one or more cameras, based on a difference in images ("image difference") between the plurality of which images, are time-sequentially continued ("the plurality of time-sequentially continuous images"); setting a parking surface occupying-judgment area for the at least one parking surface, based on images photographed by the parking recognition camera at the parking recognition time point; setting a vehicle recognition area for the vehicle, based on the images photographed by the parking recognition camera at the parking recognition time point; and determining whether the vehicle is parked on the at least one parking surface, based on the parking surface occupying-judgment area and the vehicle recognition area.

The image difference may include differences in brightness, chromaticness ("chroma") and/or color in a pixel unit of the plurality of images.

The determination of the parking recognition camera and the parking recognition time point may include: calculating an image difference between time-sequentially continued first and second images; when the image difference between the first image and the second image is equal to or more than a preset threshold value, determining a camera that photographed the first image and the second image as the parking recognition camera; and determining a time point, at which the second image was photographed, as the parking recognition time point.

The setting of the parking surface occupying-judgment area may include: setting the parking surface occupying-judgment area based on an expected range for a preset region in the vehicle recognition area in regard to the at least one parking surface, on the basis of the number of preset parking surfaces within a photographing range of the parking recognition camera; and re-setting the parking surface occupying-judgment area based on learning data in regard to the expected range.

The setting of the vehicle recognition area may include: inputting images photographed by the parking recognition camera at the parking recognition time point in a pre-learned deep learning network; and setting the vehicle recognition area for the vehicle included in the images photographed by the parking recognition camera at the parking recognition time point, on the basis of an output value of the pre-learned deep learning network.

The determining whether vehicles are parked on the at least one parking surfaces, respectively, may include: mapping the parking surface occupying-judgment area and the vehicle recognition area, on the basis of the preset parking surfaces within the photographing range of the parking recognition camera; and determining whether the preset region in the vehicle recognition area is present in the parking surface occupying-judgment area.

According to an aspect of the present invention, there is provided a computer program stored in a recording medium in order to execute the above method through a computer.

According to an aspect of the present invention, with regard to the parking recognition system for recognizing a vehicle parked on at least one parking surface, there is provided a parking recognition system including a parking recognition server, which executes performances of: acquiring a plurality of images photographed by one or more cameras, in relation to the at least one parking surface and the vehicle; determining a parking recognition time point as well as a corresponding camera for parking recognition ("a parking recognition camera") among the one or more cameras, based on a difference in images ("image difference") between the plurality of images, which are time-sequentially continued ("the plurality of time-sequentially continuous images"); setting a parking surface occupying-judgment area for the at least one parking surface, based on images photographed by the parking recognition camera at the parking recognition time point; setting a vehicle recognition area for the vehicle, based on the images photographed by the parking recognition camera at the parking recognition time point; and determining whether the vehicle is parked on the at least one parking surface, based on the parking surface occupying-judgment area and the vehicle recognition area.

The image difference may include differences in brightness, chromaticness ("chroma") and color in a pixel unit of the plurality of images.

The parking recognition server may perform: calculating the image difference between time-sequentially continued first and second images; when the image difference between the first image and the second image is equal to or more than a preset threshold value, determining a camera that photographed the first image and the second image as the parking recognition camera; and determining a time point, at which the second image was photographed, as the parking recognition time point.

The parking recognition server may further perform: setting the parking surface occupying-judgment area based on an expected range for a preset region in the vehicle recognition area in regard to the at least one parking surface, on the basis of the number of preset parking surfaces within a photographing range of the parking recognition camera; and re-setting the parking surface occupying-judgment area based on learning data in regard to the expected range.

The parking recognition server may further perform: inputting images photographed by the parking recognition camera at the parking recognition time point in a pre-learned deep learning network; and setting the vehicle recognition area for the vehicle included in the images photographed by the parking recognition camera at the parking recognition time point, on the basis of an output value of the pre-learned deep learning network.

The parking recognition server may further perform: mapping the parking surface occupying-judgment area and the vehicle recognition area, on the basis of the preset parking surfaces within the photographing range of the parking recognition camera; and determining whether the preset region in the vehicle recognition area is present in the parking surface occupying-judgment area.

In addition to the above description, other aspects, features and advantages will be more clearly understood by specific embodiments of the present invention, claims and drawings described below.

Effect of Invention

As described above, according to an embodiment of the present invention, a parking recognition method and a parking recognition system capable of efficiently recognizing vehicles parked on parking surfaces, as well as a computer program stored in a recording medium in order to execute the above method, may be implemented. Of course, the scope of the present invention is not restricted to the functional effects described above.

BRIEF DESCRIPTION OF DRAWINGS

FIG. 1 is a conceptual diagram schematically illustrating the parking recognition system and cameras, and the like, according to an embodiment of the present invention.

FIG. 2 is a block diagram schematically illustrating components of an apparatus included in the parking recognition server shown in FIG. 1.

FIG. 3 illustrates a processor configuration of the parking recognition server according to an embodiment of the present invention.

FIG. 4 is a flow chart showing the parking recognition method according to an embodiment of the present invention.

FIG. 5 illustrates the parking recognition method according to an embodiment of the present invention.

FIG. 6 illustrates the parking recognition method according to another embodiment of the present invention.

FIG. 7 illustrates the parking recognition method according to a further embodiment of the present invention.

FIG. 8 illustrates the parking recognition method according to a further embodiment of the present invention.

FIG. 9 illustrates the parking recognition method according to a further embodiment of the present invention.

FIG. 10 illustrates the parking recognition method according to a further embodiment of the present invention.

FIG. 11 illustrates the parking recognition method according to a still further embodiment of the present invention.

DESCRIPTION OF PREFERRED EMBODIMENTS OF INVENTION

The present invention may include application of various modifications and have different embodiments, in particular, specific embodiments will be illustrated in the drawings and concretely described in a detailed description. Functional effects and features of the present invention, as well as method for accomplishing the same will be clarified with reference to the following embodiments stipulated along with the drawings. However, the present invention is duly not restricted to the embodiments described below, but can be implemented in various forms.

Hereinafter, the embodiments of the present invention would be described in detail with reference to the accompanying drawings. When described with reference to the drawings, the same or corresponding constituents are given with the same reference numerals and a redundant description thereof will be omitted.

In the following embodiments, terms including an ordinal number such as first, second, etc. used herein should not be limited by the terms, but are used only for the purpose of distinguishing one component from another. Further, the singular expression includes the plural expression unless the context clearly dictates otherwise. In the present application, terms such as "including" or "comprising" mean that the feature or component described in the specification exists but should not be construed to exclude the possible addition of one or more other features or components.

In the drawings, dimensions and sizes of components indicated in the drawings may be exaggerated or reduced for convenience of description. For example, the size and thickness of each component shown in the drawings are randomly indicated for convenience of description, therefore, the present invention is of course not limited to the illustrated examples.

In the following embodiments, when a part such as section, component, unit, block or module is present above or on another part, it includes not only a case where the part exists just above the other part, but also a case where a separate section, component, unit, block or module is interposed therebetween. Further, when the sections, components, units, blocks or modules are connected, it includes not only a case where these sections, components, units, blocks are directly connected together, but also a case where these sections, components, units, blocks or modules are indirectly connected while interposing other sections, components, units, blocks or modules therebetween.

FIG. 1 is a conceptual diagram schematically illustrating the parking recognition system and camera, and the like, according to an embodiment of the present invention.

Referring to FIG. 1, the parking recognition system 1 may include a parking recognition server 300. Of course, the parking recognition system 1 may include the parking recognition server 300 and a camera 100. Components of such a parking recognition system 1 may be connected through a network in order to communicate with one another. For example, the parking recognition server 300 and the camera 100 may be connected through a network so as to communicate with each other.

However, the present invention is not particularly limited thereto, alternatively, the parking recognition system 1 may further include additional components, or some of the components may be omitted. Further, the parking recognition system 1 may include a camera edge as an edge computing device such as AI camera equipped with GPU or NPU. Some of the components in the parking recognition system 1 may be separated into a plurality of devices, otherwise, a plurality of components may be integrated into a single device.

The camera 100 is a hardware device required for photographing parking surfaces and parked vehicles in a parking lot. The camera 100 may photograph the parking surfaces and the parked vehicles in a parking lot and produce image data of the parking surfaces and the vehicles. Further, the camera 100 may transmit the image data of the parking surfaces and the vehicles to the parking recognition server 300 through a network.

The camera 100 according to an embodiment of the present invention may include a plurality of cameras. For example, as shown in FIG. 1, the parking recognition server 300 may be connected to a first camera 110, a second camera 120, a third camera 130 and an $n^{th}$ camera through a network in order to communicate with one another.

The camera 100 described above may have ID. That is, the camera 100 installed in the parking lot may have each unique ID. For example, when the first camera 110, the second camera 120, the third camera 130 and the $n^{th}$ camera are installed in the parking lot, each of the first camera 120, the second camera 120, the third camera 130 and the $n^{th}$ camera may be set in terms of installation site, photographing angle, photographing direction, etc., so as to photograph different parking surfaces. In this case, the first camera 110, the second camera 120, the third camera 130 and the $n^{th}$ camera may be set with different unique IDs, respectively. For example, ID of the camera 100 may include numerals, characters such as alphabets, special characters and/or symbols.

Further, the parking surfaces to be photographed by the first camera 110, the second camera 120, the third camera 130 and the $n^{th}$ camera may be set in advance. For instance, the number of parking surfaces photographed by the first camera 110, the second camera 120, the third camera 130 and the $n^{th}$ camera may be preset, respectively. For example, the first camera 110 may photograph eight (8) parking surfaces.

The parking recognition server 300 may acquire a plurality of images in relation to at least one parking surface and vehicle photographed by at least one camera 100. Further, the parking recognition server 300 may determine a corresponding camera for parking recognition ("a parking recognition camera") among one or more cameras and a parking recognition time point, on the basis of an image difference between time-sequentially continued plural images. Further, the parking recognition server 300 may set a parking surface occupying-judgment area for at least one parking surface, based on the image photographed by the parking recognition camera at the parking recognition time point. Further, the parking recognition server 300 may set a vehicle recognition area for a vehicle, based on the image photographed by the parking recognition camera at the parking recognition time point. Further, the parking recognition server 300 may determine whether a vehicle is parked on the at least one parking surface, on the basis of the parking surface occupying-judgment area and the vehicle recognition area. The parking recognition server 300 may be, for example, a cloud server, but is not particularly limited thereto.

The network may be defined as one or more data links that can transmit and receive data between electronic devices and/or servers, and may include wired and/or wireless communication networks. For instance, the network may include a contents delivery network (CDN) that can efficiently deliver diverse user selective type contents. Alternatively, the network may include, for example, cellular (i.e., WAN, UDP, etc.), Wifi, Bluetooth, Bluetooth Low Energy, Zigbee or Ultra Wide Band (UWB), however, the meanings of network in the present invention are not particularly limited thereto.

As such, the parking recognition system 1 according to an embodiment of the present invention may determined whether a vehicle is parked on a parking surface, based on the image photographed by the parking recognition camera at the parking recognition time point, thereby attaining effects of minimizing the consumption of computing power.

FIG. 2 is a block diagram schematically illustrating components of a device included in the parking recognition server shown in FIG. 1, while FIG. 3 illustrates a processor configuration of the parking recognition server according to an embodiment of the present invention.

Firstly, referring to FIG. 2, the parking recognition server 300 may include a communication module 310, a processor 320 and a memory 330.

The communication module 310 may communicate with various types of external devices or servers according to different communication modes. The communication module 310 may be linked to a communication module of another device through a network so as to transmit and receive data therebetween. For instance, the communication module 310 may be connected to a communication module of the camera 100 through a network, so as to transmit and receive data to each other.

The processor 320 may execute an operation of generally controlling the parking recognition system 1 using a variety of programs stored in the memory 330. The processor 320 may include different processing units such as a microprocessor, a central processing unit (CPU), a processor core, a multiprocessor, ASIC (Application-Specific Integrated Circuit), FPGA (Field Programmable Gate Array), or the like, however, the present invention is not particularly limited thereto.

The memory 330 may temporarily or permanently store data treated by the parking recognition server 300. The memory 300 may include permanent mass storage devices such as RAM (Random Access Memory), ROM (Read Only Memory) and a disk drive, however, the present invention is not particularly limited thereto.

The parking recognition server 300 as shown in FIG. 2 may further include a storage medium (not shown), in which different data for overall operations or functions such as a program for processing or controlling by the processor 320 are stored. The storage medium may store a plurality of application programs or applications driven in the parking recognition server 300, and data and instructions for operation of the parking recognition server 300. At least some of the application programs may be downloaded from an external server through wireless communication. Further, at least some of the application programs may exist on the parking recognition server 300 from the time of delivery for basic functions of the parking recognition server 300. The application program may be stored in the storage medium and may be driven by the processor 320 in order to execute an operation (or function) of the parking recognition server 300.

The parking recognition system 1 and modules or units included therein may be entirely hardware or partially hardware while having a software aspect. For instance, the parking recognition system 1 and modules or units included therein may collectively refer to hardware and related software for processing specific types of data and contents thereof or for transmitting/receiving the data in an electronic communication manner. The terms "unit", "module", "device", "terminal" or "system" used herein may be interpreted to refer to a combination of hardware and software driven by the hardware. For example, the hardware may be a data processing device comprising a CPU or other processors. Further the software driven by the hardware may refer to a running process, an object, an executable file, a thread of execution, a program, or the like.

Further, individual elements constructing the parking recognition system 1 are not particularly restricted to refer to alternative devices mechanically or physically distinguished from one another. That is, the communication module 310, the processor 320 and the memory 330 are merely distinguished in terms of functions according to operations executed by the parking recognition server 300, but not necessarily and independently divided from one another. Of course, according to embodiments, these elements may also be embodied as separate devices mechanically or physically divided from one another.

The communication mode is not particularly limited, and may include a communication method using a communication network (for example, a mobile communication network, a wired Internet, a wireless Internet, a broadcasting network), which may be included in the network, as well as a short-range wireless communication between the devices. For example, the network may include any one or more networks among a personal area network (LAN), a local area network (LAN), a campus area network (CAN), a metropolitan area network (MAN), a wide area network (WAN), Internet, and the like. The network may also include any one or more network topologies including a bus network, a star network, a ring network, a mesh network, a star-bus network, a tree or hierarchical network, but is not particularly limited thereto.

Further, the communication module 310 may communicate with the external server through a network. Without limitation of the communication mode, the network may be a short-range wireless communication network. For instance, the network may be Bluetooth, BLE (Bluetooth Low Energy) or WiFi communication network.

Further, according to other embodiments, the parking recognition server 300 may include many more components than the components shown in FIG. 2. For instance, the parking recognition server 300 may be implemented to include input/output (I/O) devices or may further include additional components such as a battery and a charging device to supply power to internal components, various sensors, database, or the like.

Hereinafter, referring to FIG. 3, an internal configuration of the processor 320 in the parking recognition server 300 according to an embodiment of the present invention will be discussed in detail. The processor 320 will be described under assumption that it is a processor 320 of the parking recognition server 300 shown in FIG. 1 for convenience of understanding.

The processor 320 of the parking recognition server 300 according to an embodiment of the present invention may include an image acquiring unit 321, a parking recognition determining unit 323, a parking surface occupying-judgment area setting unit 325, a vehicle recognition area setting unit 327, and a parking determination unit 329. According to some embodiments, components of the processor 320 may be optionally included in the processor 320 or excluded therefrom. Further, according to some embodiments, the components of the processor 320 may be separated or integrated for exhibiting functions of the processor 320.

Such a processor 320 and components thereof may control the parking recognition server 300 to execute stages (S110 to S150) included in the parting recognition method shown in FIG. 4. For instance, the processor 320 and the components of the processor 320 may be implemented to execute instructions according to a code of an operation system and a code of at least one program included in the memory 330. In this regard, the components of the processor 320 may exhibit different functions of the processor 320, which are executed by the processor 320 according to the instruction from a program code stored in the parking recognition server 300. Specific operations of the processor 320 will be described with reference to the flow chart of the parking recognition method shown in FIG. 4.

FIG. 4 is a flow chart illustrating the parking recognition method according to an embodiment of the present invention.

In stage S110, the parking recognition server 300 may acquire a plurality of images for at least one parking surface and vehicle photographed by at least one camera. For instance, the parking recognition server 300 may acquire a plurality of images for a plurality of parking surfaces and vehicles photographed by a plurality of cameras installed in a parking lot. For example, the parking recognition server 300 may acquire a plurality of images photographed by first, second, third and n$^{th}$ cameras, respectively. That is, the plurality of images photographed by the first, second, third and n$^{th}$ cameras, respectively, may include vehicles parked in the plurality of parking surfaces within the photographing ranges of the cameras, respectively. For example, a photographing range of the first camera may include eight (8) parking surfaces. Further, a photographing range of the second camera may include nine (9) parking surfaces. In this case, the eight (8) parking surfaces included in the photographing range of the first camera may be different from the nine (9) parking surfaces included in the photographing range of the second camera.

In stage S120, the parking recognition server 300 may determine a corresponding camera for parking recognition ("parking recognition camera") among one or more cameras, as well as a parking recognition time point, on the basis of an image difference between time-sequentially continued plural images. For instance, the parking recognition server 300 may acquire a plurality of time-sequentially continuous images from a plurality of cameras. For example, the parking recognition server 300 may acquire first image and second image, which are time-sequentially continued, from the first camera. In this case, the first image may be an image photographed at a time point prior to the second image in the time-sequential aspect. For example, the parking recognition server 300 may acquire the first image and the second image from the first camera at a preset time interval.

The parking recognition server 300 according to an embodiment of the present invention may determine the corresponding camera for parking recognition among the plurality of cameras. Further, the parking recognition server 300 may determine the parking recognition time point as a time at which it is determined whether a vehicle is parked on a parking surface. For example, the parking recognition server 300 may determine a parking recognition camera and a parking recognition time point, on the basis of an image difference between time-sequentially continued first image and second image.

According to an embodiment of the present invention, the image difference between a plurality of images may include a difference in brightness, chromaticness ("chroma") and color in a pixel unit of the plurality of images. For example, an image difference between first image and second image may include brightness, chroma or color in each pixel unit of the first and second images. For instance, the parking recognition server 300 may calculate image differences between a plurality of images using an image comparison instruction (i.e., AbsDiff). However, the present invention is not particularly limited thereto.

According to an embodiment of the present invention, the parking recognition server 300 may calculate an image difference between time-sequentially continued first and second images. For instance, the parking recognition server 300 may calculate the image difference between the first image and the second image using an image comparison instruction (i.e., AbsDiff).

Further, the parking recognition server 300 may determine a camera photographing the first image and the second image as the parking recognition camera if the image difference is equal to or more than a preset threshold value. For instance, if the preset threshold value for the image difference is 10 and the image difference between the first image and the second image is 10 or more, the parking recognition server 300 may determine a camera photographing the first image and the second image among the plurality of cameras as the parking recognition camera. For example, the first camera may be determined as the parking recognition camera.

Further, the parking recognition server 300 may preferentially determine a camera having the greatest image difference among the plurality of cameras as the parking recognition camera, on the basis of an image difference between first image and second image of each of the plurality of cameras. In other words, the parking recognition server 300 may preset a higher preferential order of mathematical operation for parking recognition ("parking recognition operation") in regard to a camera having the greatest image difference value according to the image difference value.

According to the present invention, selecting the camera under preferential order of the parking recognition operation among the plurality of cameras, based on the image difference may attain effects of more efficiently performing an object recognition process that involves considerable consumption of computing power.

Further, the parking recognition server 300 may determine a time point, at which the second image was photographed, as the parking recognition time point. For instance, if a preset threshold value for image difference is 10 and an image difference between first image and second image is 10 or more, the parking recognition server 300 may determine a time point at which the second image was photographed ("second image photographing time point") as the parking recognition time point. That is, a specific time including hours, minutes and seconds may be determined as the parking recognition time point. In stage S130, the parking recognition server 300 may set a parking surface occupying-judgment area for at least one parking surface, on the basis of the image photographed by the parking recognition camera at the parking recognition time point. For instance, the parking recognition server 300 may set parking surface occupying-judgment areas for a plurality of parking surfaces, on the basis of the image photographed by the first camera at the second image photographing time point. For example, the parking recognition server 300 may set the parking surface occupying-judgment area for at least one parking surface included in the second image, based on the second image photographed by the first camera. For instance, the parking recognition server 300 may set eight (8) parking surfaces occupying-judgment areas for the eight (8) parking surfaces included in the second image, respectively, based on the second image photographed by the first camera.

According to an embodiment of the present invention, the parking recognition server 300 may determine a parking surface occupying-judgment area for at least one parking surface based on an expected range for a preset region in the vehicle recognition area, on the basis of the number of preset parking surfaces within a photographing range of the parking recognition camera. For instance, the parking recognition server 300 may set parking surface occupying-judgment areas for eight (8) parking surfaces, based on the number of parking surfaces, that is, eight (8) within a photographing range of the first camera. For example, the number of parking surfaces within the photographing range of each camera may be set in advance. Herein, the parking surface occupying-judgment area may be set on the basis of the expected range for the preset region in the vehicle recognition area. For example, if the vehicle recognition area is set in a rectangular shape, the parking surface occupying-judgment area may be set based on an expect range for a location of a lower edge of the vehicle recognition area at a road side in a parking lot. That is, the parking surface occupying-judgment area may be set on the basis of the expected range for positions at which a location of the lower edge of the vehicle recognition area at a road side in the parking lot is presumed to exist.

In an embodiment of the present invention, the parking recognition server 300 may transform the parking surface occupying-judgment area through Homographic Transformation Matrix. Further, the parking recognition server 300 may transform the vehicle recognition area through Homographic Transformation Matrix. Further, the parking recognition server 300 may determine whether a preset region in the vehicle recognition area exists in the parking surface occupying-judgment area through Homographic Transformation Matrix.

$$p' = H\, p \quad \text{<Equation 1>}$$

$$h: P^2 \rightarrow P^2 \quad \text{<Equation 2>}$$

$$\begin{pmatrix} p'_1 \\ p'_2 \\ p'_3 \end{pmatrix} = \begin{bmatrix} h_{11} & h_{12} & h_{13} \\ h_{21} & h_{22} & h_{23} \\ h_{31} & h_{32} & h_{33} \end{bmatrix} \begin{pmatrix} p_1 \\ p_2 \\ p_3 \end{pmatrix}$$

Wherein H denotes Homographic Transformation Matrix; $p_1(x_1, y_1)$, $p_2(x_2, y_2)$, $p_3(x_3, y_3)$ indicate a plurality of random coordinates for the parking surface occupying-judgment area before transformation, or a plurality of random coordinates for the vehicle recognition area before transformation; $p_1'(x_1', y_1')$, $p_2'(x_2', y_2')$, $p_3'(x_3', y_3')$ indicate a plurality of coordinates corresponding to the parking surface occupying-judgment area after transformation, or a plurality of coordinates corresponding to the vehicle recognition area. An equation expressing a homogeneous coordinate transformation matrix in regard to corresponding points (or dots) is indicated as follows:

$$s\begin{pmatrix} x_i' \\ y_i' \\ 1 \end{pmatrix} = \begin{bmatrix} h_1 & h_2 & h_3 \\ h_4 & h_5 & h_6 \\ h_7 & h_8 & h_9 \end{bmatrix} \begin{pmatrix} x_i \\ y_i \\ 1 \end{pmatrix}, \quad i = 1, 2, \ldots \qquad \text{<Equation 3>}$$

(wherein s denotes a scale factor for homogeneous coordinate transformation)

Particularly, in an operation process through homographic transformation, when using a ceiling part of a vehicle, that is, a coordinate on an upper end of the vehicle recognition area, an error may occur compared to an actual location during homographic transformation. On the contrary, according to the present invention, the bottom of a vehicle, that is, a coordinate on a lower end of the vehicle recognition area is used in an (mathematical) operation process through homographic transformation, thereby attaining effects of not causing an error.

Further, the parking recognition server 300 may reset the parking surface occupying-judgment area based on a learning data in regard to the expected range for the preset region in the vehicle recognition area. For instance, the parking recognition server 300 may reset the parking surface occupying-judgment area based on a learning data in regard to a location of a lower edge of the vehicle recognition area at a road side in a parking lot. For example, the learning date may be cumulative data for an expected range in a preset time period by the parking recognition server.

In stage S140, the parking recognition server 300 may set a vehicle recognition area for a vehicle on the basis of images photographed by a parking recognition camera at a parking recognition time point. For instance, the parking recognition server 300 may set vehicle recognition areas for vehicles included in the second image, respectively, based on the second image photographed by a first camera.

According to an embodiment of the present invention, the parking recognition server 300 may input the image photographed by the parking recognition camera at the parking recognition time point in a pre-learned deep learning network. For instance, the parking recognition server 300 may set vehicle recognition areas for vehicles, respectively, using a deep learning object sensing program (i.e., YOLO v5). For example, the parking recognition server 300 may input the second image photographed by the first camera in the deep learning object sensing program.

Further, the deep learning network according to an embodiment of the present invention may be learned in advance through vehicle image data photographed by a plurality of cameras. However, the deep learning network of the present invention is not particularly limited to the above illustration, but may be implemented in various forms of artificial neural networks.

Further, the parking recognition server 300 may set a vehicle recognition area for a vehicle included in the image photographed by the parking recognition camera at the parking recognition time point, on the basis of output values of the pre-learned deep learning network. For instance, the parking recognition server 300 may input the second image photographed by the first camera in the deep learning object sensing program, followed by setting the vehicle recognition areas for the vehicles included in the second image, on the basis of output values from the deep learning object sensing program. For example, the vehicle recognition area may be implemented in a rectangular shape including appearance of a vehicle. However, the present invention is not particularly limited thereto.

In stage S150, the parking recognition sever 300 may determine whether a vehicle is parked on at least one parking surface on the basis of the parking surface occupying-judgment area and the vehicle recognition area. For instance, if seven (7) vehicles are parked on eight (8) parking surfaces included in the second image photographed by the first camera, the parking recognition server may set eight (8) parking surface occupying-judgment areas and seven (7) vehicle recognition areas, respectively, for the eight (8) parking surfaces included in the second image photographed by the first camera. Further, the parking recognition server 300 may determine whether the vehicles are parked on the eight (8) parking surfaces, respectively.

According to an embodiment of the present invention, the parking recognition server 300 may execute mapping of the parking surface occupying-judgment area and the vehicle recognition area, on the basis of a preset parking surface within a photographing range of the parking recognition camera. For instance, if seven (8) vehicles are parked on eight (8) parking surfaces included in the second image photographed by the first camera, the parking recognition server 300 may make eight (8) parking surface occupying-judgment areas to correspond to the eight (8) parking surfaces included in the second image photographed by the first camera, respectively. In other words, the eight (8) parking surfaces may correspond to the eight (8) parking surface occupying-judgment area one by one. Further, the parking recognition server 300 may make the seven (7) vehicle recognition areas to correspond to the eight (8) parking surfaces included in the second image. That is, except for one of the parking surfaces, on which no vehicle is parked, the other seven (7) parking surfaces may correspond to the seven (7) vehicle recognition areas one by one. Further, the parking recognition server may also make the seven (7) vehicle recognition areas to correspond to the seven (7) parking surface occupying-judgment areas, respectively, among the eight (8) parking surface occupying-judgment areas. That is, except for the parking surface occupying-judgment area corresponding to the parking surface, on which no vehicle is parked, the other seven (7) parking surface occupying-judgment areas may correspond to the seven (7) vehicle recognition areas one by one.

Further, the parking recognition server 300 may determine whether the preset region in the vehicle recognition area exists in the parking surface occupying-judgment area. For instance, when a vehicle recognition area is implemented in a rectangular shape, the parking recognition server 300 may determine whether a lower edge of the vehicle recognition area at a road side in a parking lot is present in a parking surface occupying-judgment area. For example, the parking recognition server 300 may determine whether the preset region in the vehicle recognition area exists in the parking surface occupying-judgment area with respect to the vehicle recognition area and the parking surface occupying-judgment area mapped to each other. For example, if the preset region in the vehicle recognition area is present in the parking surface occupying-judgment area, the parking recognition server 300 may determine that a vehicle is parked on a corresponding parking surface.

FIGS. 5 to 7 illustrates the parking recognition method according to an embodiment of the present invention.

Firstly, referring to FIG. 5, an image photographed by a camera according to an embodiment of the present invention is illustrated. For example, as shown in FIG. 5, the image photographed by a camera may include a plurality of vehicles C and parking surfaces. In other words, a parking surface may mean each surface partitioned by parking lines L. For example, as shown in FIG. 5, a parking surface in a rectangular shape may be formed by the parking lines L.

Referring to both of FIGS. 5 and 6, the camera according to an embodiment of the present invention may photograph a plurality of time-sequentially continuous images. For instance, a first image (i1) shown in FIG. 5 and a second image (i2) shown in FIG. 6 may be time-sequentially continued. More specifically, a vehicle 62 in the second image (i2) was newly added to an empty parking surface included in the first image (i1). Further, a parked vehicle 51 shown in the first image (i1) was altered to the vehicle 61 in the second image (i2). Further, another parked vehicle 53 in the first image (i1) was driven out of the parking surface in the second image (i2) so that the second image (i2) includes one vacant parking surface.

Referring to FIG. 7, there is illustrated a third image (i3) in which an image difference between the first image (i1) and the second image (i2) is calculated by the parking recognition server according to an embodiment of the present invention. For instance, the parking recognition server may subtract the second image (i2) from the first image (i1) to thus calculate an image difference between the first image (i1) and the second image (i2). For example, as shown in FIG. 7, a part 72 of the vehicle 62 in the second image (i2) newly added to the one vacant parking surface included in the first image (i1); a part 71 in which the parked vehicle 51 in the first image (i1) was altered to the vehicle 61 in the second image (i2); and a part 73 in which the parked vehicle 53 in the first image (i1) was driven out of the parking surface in the second image (i2), may be demonstrated in different brightness, chroma and colors, etc., which are distinguished from other parts in the third image (i3). However, the appearance in FIG. 7 is merely illustrative, and the present invention is not particularly limited thereto.

FIGS. 8 to 11 illustrate the parking recognition method according to other embodiments of the present invention.

Firstly, referring to FIG. 8, the parking recognition server according to an embodiment of the present invention may set parking surface occupying-judgment areas (81, 82, 83, 84, 85, 86, 87, 88). For instance, as shown in FIG. 8, the parking recognition server may set the parking surface occupying-judgment areas (81, 82, 83, 84, 85, 86, 87, 88), respectively, for corresponding parking surfaces.

Referring to FIG. 9, the parking recognition server according to an embodiment of the present invention may set vehicle recognition areas (91, 92, 93, 94, 95, 96, 97). For instance, as shown in FIG. 9, the parking recognition server may set the vehicle recognition areas (91, 92, 93, 94, 95, 96, 97), respectively, for corresponding vehicles.

Referring FIGS. 10 and 11, the parking recognition server according to an embodiment of the present invention may determine whether a vehicle is parked on each parking surface, on the basis of the parking surface occupying-judgment areas (81, 82, 83, 84, 85, 86, 87, 88) and the vehicle recognition areas (91, 92, 93, 94, 95, 96, 97).

The parking recognition server according to an embodiment of the present invention may map the parking surface occupying-judgment area and the vehicle recognition area, on the basis of a preset parking surface within a photographing range of the parking recognition camera. Herein, the parking surface occupying-judgment area of each parking surface may not be coincident with an outline (or boundary) of the parking surface. For example, as shown in FIG. 10, the parking recognition server may map the parking surface occupying-judgment areas (81, 82, 83, 84, 85, 86, 87, 88) and the vehicle recognition areas (91, 92, 93, 94, 95, 96, 97), on the basis of eight (8) parking surfaces within the photographing range of the first camera. That is, a first parking surface occupying-judgment area 81 and a first vehicle recognition area 91 may be mapped; a second parking surface occupying-judgment area 82 and a second vehicle recognition area 92 may be mapped; a third parking surface occupying-judgment area 83 and a third vehicle recognition area 93 may be mapped; a fourth parking surface occupying-judgment area 84 and a fourth vehicle recognition area 94 may be mapped; a fifth parking surface occupying-judgment area 85 and a fifth vehicle recognition area 95 may be mapped; a sixth parking surface occupying-judgment area 86 and a sixth vehicle recognition area 96 may be mapped; and a seventh parking surface occupying-judgment area 87 and a seventh vehicle recognition area 97 may be mapped.

Further, the parking recognition server may determine whether the preset region in the vehicle recognition area exists in the parking surface occupying-judgment area. For instance, as shown in FIG. 11, the parking recognition server may determine whether a location of the lower edge (Z) of the seventh vehicle recognition area 97 at a road side in the parking lot is present in the seventh parking surface occupying-judgment area 87. For instance, referring to FIG. 11, since the edge of the seventh vehicle recognition area 97 is positioned in the seventh parking surface occupying-judgment area 87, the parking recognition server determine that a vehicle is parked on the seventh parking surface. Further, since an edge of the vehicle recognition area is not recognized in the eighth parking surface occupying-judgment area 88, the parking recognition server may determine that no vehicle is parked on the eighth parking surface.

According to an embodiment of the present invention, the parking recognition server may output determined result of parking recognition as a resulting data. For instance, the parking recognition server may output the determined result of parking recognition as a resulting data in the form of Array in Array.

For instance, the parking recognition server may output a resulting data which includes "1" indicating a case where a vehicle is parked on a parking surface and "0" indicating a case where no vehicle is parked on a parking surface. Therefore, the parking recognition server may output a resulting data which includes [1, 1, 1, 1, 1, 1, 1, 0] for the eight (8) parking surfaces photographed by the first camera. That is, this demonstrates that vehicles are parked on the first to seventh parking surfaces while no vehicle is parked on the eighth parking surface.

According to the present invention, it is determined whether a vehicle is parked on a parking surface based on image differences between a plurality of images, therefore, the present invention may attain effects of minimizing and lightening the consumption of computing power.

Further, according to the present invention, a final data including the determined result of parking recognition may be output in a form of lightened data, thereby attaining effects of easily (simply) transmitting and utilizing the data.

The device and/or system described above may be implemented by hardware components, software components, and/or a combination of hardware components and software components. The device and components described in the embodiments may be implemented by one or more general-purpose computers or special-purpose computers including, for example, a processor, a controller, ALU (arithmetic logic unit), a digital signal processor, a micro-computer, FPGA (field programmable gate array), PLU (programmable logic unit), a micro-processor, or any other device capable of executing and responding to instructions, and the like. The processing device may execute an operating system (OS) and one or more software applications running on the operating system. The processing device may also access, store, manipulate, process and generate data in response to the execution of the software. For the convenience of understanding, a processing device may be described as one being used, but a person skilled in the art will appreciate that the processing device may include a plurality of processing elements and/or a plurality of types of processing elements. For example, the processing device may include a plurality of processors or one process as well as one controller. In addition, other processing configurations such as parallel processors are also possible.

The software may include a computer program, code, instructions, or a combination of one or more thereof, may configure the processing device in order to operate as desired, or may conduct instructions for the t processing device independently or collectively. Software and/or data may be embodied permanently or temporally in any type of machine, component, mechanical or physical device, virtual equipment, computer storage medium or device, or signal wave to be transmitted, so as to be interpreted by the processing device or to provide instructions or data to the processing device. The software may be distributed over networked computer systems so that these are stored or executed in a distributed manner. Software and data may be stored on one or more computer readable recording media.

The method according to the embodiment may be embodied in the form of program instructions that can be executed by various computer means and then recorded in a computer-readable medium. The computer-readable medium may include program instructions, data files, data structures, and the like, alone or in combination thereof. The program instructions recorded on the media may be those specially designed and constructed for the purposes of the embodiments, or these may be of the kind well-known and available to those having skill in the computer software arts. Examples of the computer-readable recording medium may include magnetic media such as hard disks, floppy disks and magnetic tape, optical media such as CD-ROMs, DVDs, etc., magneto-optical media such as floptical disks, and hardware devices specifically configured to store and execute program instructions, such as ROM, RAM, flash memory, and the like. Examples of the program instructions may include not only machine code generated by a compiler, but also high-level language code that can be executed by a computer using an interpreter or the like. The hardware device described above may be configured to operate as one or more software modules to perform the operations of the above embodiments, and vice versa.

Although the present invention has been described by the embodiments illustrated in the drawings, these are merely illustrative, and those skilled in the art will understand that various modifications and other equivalent embodiments are possible from the above description. Therefore, technical and true protective range of the present invention should be defined by the technical scope of the appended claims.

The invention claimed is:

1. A parking recognition method for recognizing a vehicle parked on at least one parking surface, comprising:
    acquiring a plurality of images photographed by cameras, in relation to the at least one parking surface and the vehicle;
    determining a parking recognition time point as well as a corresponding camera for parking recognition ("a parking recognition camera") among the cameras, based on a difference in images ("image difference") between the plurality of images, which are time-sequentially continued ("the plurality of time-sequentially continuous images");
    setting a parking surface occupying-judgment area for the at least one parking surface, based on an image photographed by the parking recognition camera at the parking recognition time point;
    setting a vehicle recognition area for the vehicle, based on the image photographed by the parking recognition camera at the parking recognition time point; and
    determining whether the vehicle is parked on the at least one parking surface, based on the parking surface occupying-judgment area and the vehicle recognition area.

2. The parking recognition method according to claim 1, wherein the image difference includes differences in brightness, chromaticness ("chroma") and/or color in a pixel unit of the plurality of images.

3. The parking recognition method according to claim 1, wherein the determination of the parking recognition camera and the parking recognition time point includes:
    calculating the image difference between time-sequentially continued first and second images;
    when the image difference between the first image and the second image is equal to or more than a preset threshold value, determining a camera that photographed the first image and the second image as the parking recognition camera; and
    determining a time point, at which the second image was photographed, as the parking recognition time point.

4. The parking recognition method according to claim 1, wherein the setting of the parking surface occupying-judgment area includes:
    setting the parking surface occupying-judgment area based on an expected range for a preset region in the vehicle recognition area in regard to the at least one parking surface, on the basis of the number of preset parking surfaces within a photographing range of the parking recognition camera; and
    re-setting the parking surface occupying-judgment area based on learning data in regard to the expected range.

5. The parking recognition method according to claim 1, wherein the setting of the vehicle recognition area includes:
    inputting images photographed by the parking recognition camera at the parking recognition time point in a pre-learned deep learning network; and
    setting the vehicle recognition area for the vehicle included in the images photographed by the parking recognition camera at the parking recognition time point, on the basis of an output value of the pre-learned deep learning network.

6. The parking recognition method according to claim 1, wherein the determining whether the vehicle is parked on the at least one parking surface includes:

mapping the parking surface occupying-judgment area and the vehicle recognition area, on the basis of the preset parking surfaces within the photographing range of the parking recognition camera; and determining whether the preset region in the vehicle recognition area is present in the parking surface occupying-judgment area.

7. A parking recognition system for recognizing a vehicle parked on at least one parking surface, the system comprising a parking recognition server, which executes performances of:

acquiring a plurality of images photographed by cameras, in relation to the at least one parking surface and the vehicle;

determining a parking recognition time point as well as a corresponding camera for parking recognition ("a parking recognition camera") among the cameras, based on a difference in images ("image difference") between the plurality of images, which are time-sequentially continued ("the plurality of time-sequentially continuous images");

setting a parking surface occupying-judgment area for the at least one parking surface, based on an image photographed by the parking recognition camera at the parking recognition time point;

setting a vehicle recognition area for the vehicle, based on the image photographed by the parking recognition camera at the parking recognition time point; and determining whether the vehicle is parked on the at least one parking surface, based on the parking surface occupying-judgment area and the vehicle recognition area.

8. The parking recognition system according to claim 7, wherein the image difference includes differences in brightness, chromaticness ("chroma") and color in a pixel unit of the plurality of images.

9. The parking recognition system according to claim 7, wherein the parking recognition server performs:

calculating the image difference between time-sequentially continued first and second images;

when the image difference between the first image and the second image is equal to or more than a preset threshold value, determining a camera that photographed the first image and the second image as the parking recognition camera; and determining a time point, at which the second image was photographed, as the parking recognition time point.

10. The parking recognition system according to claim 7, wherein the parking recognition server performs:

setting the parking surface occupying-judgment area based on an expected range for a preset region in the vehicle recognition area in regard to the at least one parking surface, on the basis of the number of preset parking surfaces within a photographing range of the parking recognition camera; and re-setting the parking surface occupying-judgment area based on learning data in regard to the expected range.

11. The parking recognition system according to claim 7, wherein the parking recognition server further performs:

inputting images photographed by the parking recognition camera at the parking recognition time point in a pre-learned deep learning network; and setting the vehicle recognition area for the vehicle included in the images photographed by the parking recognition camera at the parking recognition time point, on the basis of an output value of the pre-learned deep learning network.

12. The parking recognition system according to claim 7, wherein the parking recognition server further performs:

mapping the parking surface occupying-judgment area and the vehicle recognition area, on the basis of the preset parking surfaces within the photographing range of the parking recognition camera; and determining whether the preset region in the vehicle recognition area is present in the parking surface occupying-judgment area.

* * * * *